United States Patent [19]

Blair et al.

[11] Patent Number: 4,773,001
[45] Date of Patent: Sep. 20, 1988

[54] METHOD AND APPARATUS FOR COMMUNICATING WITH REMOTE UNITS OF A DISTRIBUTIVE DATA PROCESSING SYSTEM

[75] Inventors: Brian E. Blair; David R. Hughes, both of Raleigh; Hollis P. Posey, Cary; Alexander Polischuk-Sawtschenko, Raleigh, all of N.C.

[73] Assignee: International Business Machines Corp., Armonk, N.Y.

[21] Appl. No.: 782,794

[22] Filed: Oct. 2, 1985

[51] Int. Cl.⁴ .......................... G06F 13/38
[52] U.S. Cl. .......................... 364/200
[58] Field of Search .............. 364/200, 900; 340/825.52, 825.5, 825.07, 825.08, 825.59; 370/82, 92

[56] References Cited

U.S. PATENT DOCUMENTS

| | | | |
|---|---|---|---|
| 3,866,175 | 2/1975 | Seifert, Jr. et al. | 340/825.52 |
| 4,031,512 | 6/1977 | Faber | 364/200 X |
| 4,298,978 | 11/1981 | Nakamura | 370/82 |
| 4,335,426 | 6/1982 | Maxwell et al. | 364/200 |
| 4,466,001 | 8/1984 | Moore et al. | 340/825.47 |
| 4,608,562 | 8/1986 | Minor et al. | 340/825.59 |

Primary Examiner—Thomas M. Heckler
Attorney, Agent, or Firm—Joscelyn G. Cockburn

[57] ABSTRACT

Described is an architecture and protocol for exchanging messsages within a distributive data processing system. Instead of transmitting a frame with a beginning flag field (SDEL) followed by an address field as is the usual case, the SDEL field and address field collapsed and merged into a single field. The field includes a control bit whose setting determines whether the field is the beginning of a frame or otherwise. A second control bit within the single field is used to identify the type of message being transmitted and the response that a recipient station is permitted to return to a control unit issuing the message. The protocol is well suited for framing messages in the well known SDLC communications format. In this format it allows the detection of delimiters without resorting to bit stuffing.

12 Claims, 8 Drawing Sheets

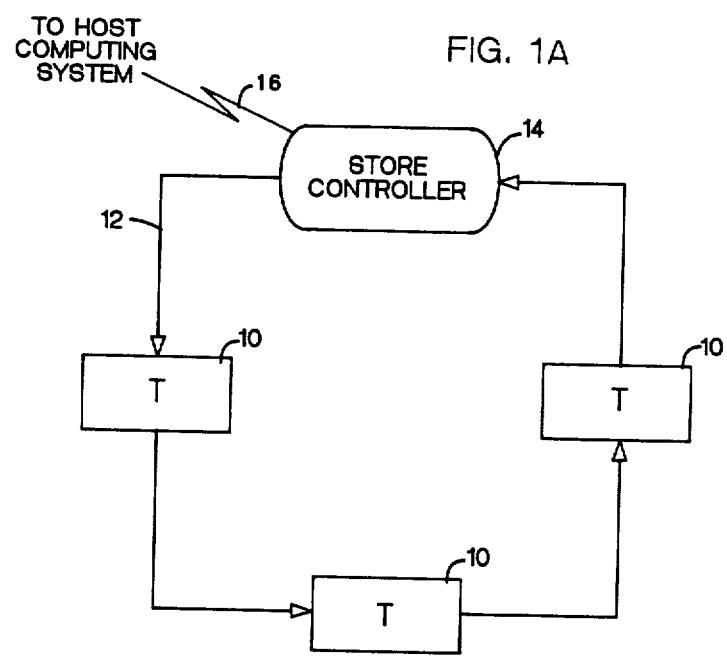

DATA FRAME | ADDRESS | CONTROL | DATA | CRC | CRC | FLAG |

RESPONSE FRAME | ADDRESS | CONTROL | CRC | CRC | FLAG |

POLL FRAME | 24 "ONE BITS" | ADDRESS | 24 "ONE BITS" | ADDRESS |

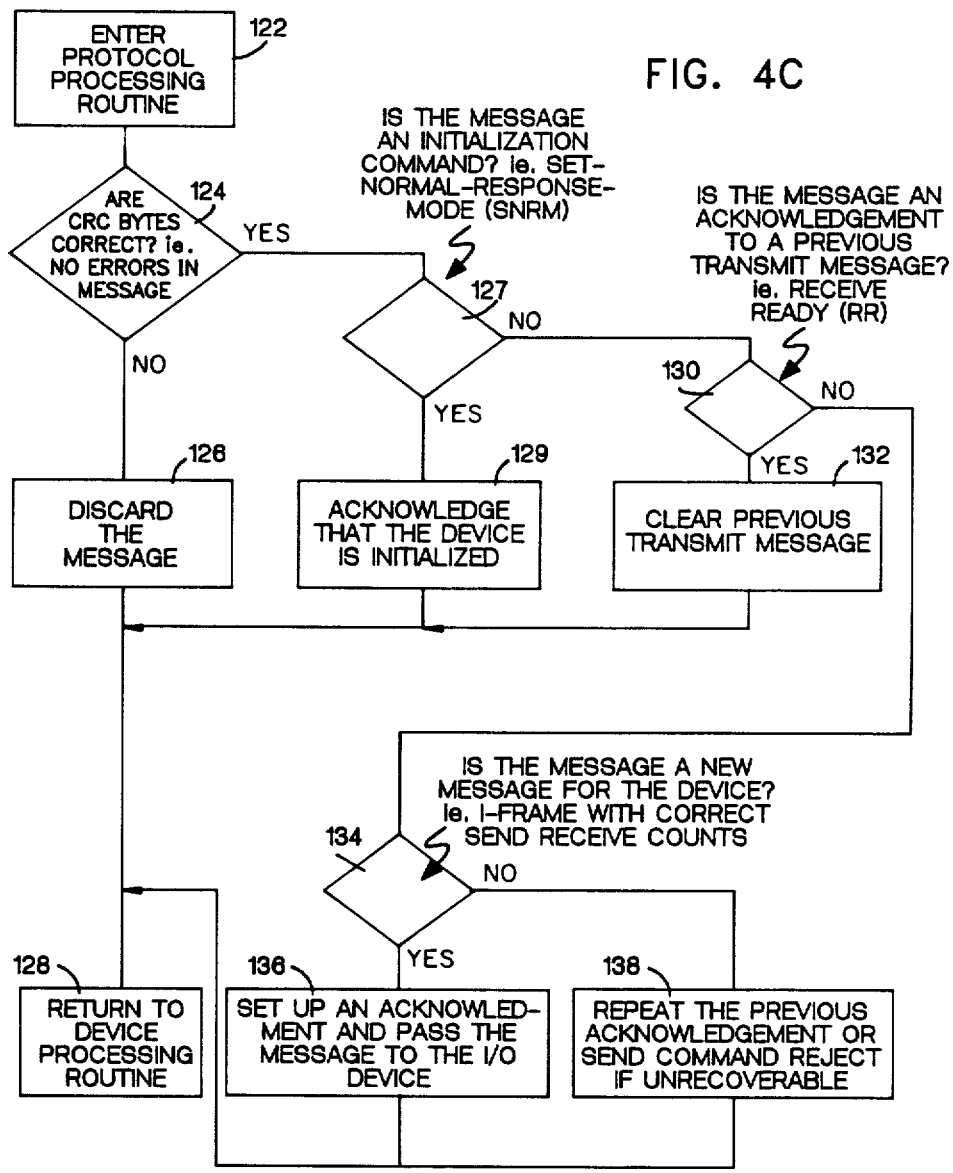

METHOD AND APPARATUS FOR COMMUNICATING WITH REMOTE UNITS OF A DISTRIBUTIVE DATA PROCESSING SYSTEM

CROSS REFERENCE TO RELATED PATENT APPLICATIONS

The present patent application relates to application Ser. No. 637,369 now abandoned in favor of application Ser. No. 042,556 entitled, "Architecture for a Distributive Microprocessing System," the inventors being M. A. Orr et al.

The desriptions set fourth in said co-pending application are hereby incorporated by reference.

BACKGROUND OF THE INVENTION (1) Field of the Invention

The present invention relates to teleprocessing systems in general and more particularly to a protocol for controlling the exchange of messages within the teleprocessing system.

(2) Background of the Invention

The use of teleprocessing and/or distributive processing as a means for gathering and/or disseminating information is well known in the prior art. Teleprocessing is practiced in several areas of our society. Without the use of teleprocessing, the affected areas would not be as developed and efficient as they are today. Among the areas in which teleprocessing has become important are banking systems, retail stores, supermarkets, etc.

A typical distributive data processing system consists of a plurality of data terminals or other types of I/O devices coupled via communications lines to a main computer. The I/O devices may include keyboards, magnetic stripe readers, displays, scanners, etc. Data such as pricing information, inquiries, etc. are entered at the I/O devices transmitted to the main processor for processing and the result is returned to the I/O devices.

In addition to the basic configuration outlined above, every teleprocessing installation requires a set of rules or transmission techniques (sometimes called protocols) to control the transmission of messages within the installation. It has been determined that an efficient teleprocessing installation is one which utilizes a well-planned protocol. Such a protocol should not only deliver data but also provide a mechanism for path control, error detection, automatic error recovery, etc. The well known synchronous data link control (SDLC) network protocol meets these requirements. The SDLC techniques were developed and introduced by IBM, the assignee of the present invention. Because of the efficiency with which the SDLC techniques move data within a network, they are fast becoming the standard in the industry.

The basic transmission unit used in SDLC is called a frame. The format for an SDLC frame consists of a beginning flag field, an address field, a control field, an information field, two CRC fields, and an ending flag field. The fields are concatenated in the order of recitation. For proper operation it is important that a receiver must be able to identify the delimiters (that is, beginning and 10 ending flags) of a frame. To this end, the flag bytes are assigned a unique bit pattern (such as 01111110). This pattern is prevented from appearing elsewhere in the frame by a technique called bit stuffing. Simply stated, the bit stuffing technique requires that when transmitting a frame, a logical "0" bit is inserted after every string of five consecutive logical "1" bits are transmitted. Stated another way, for every string of five consecutive logical "1" bits transmitted, a logical "0" bit is also transmitted. However, when a flag byte is transmitted, the logical "0" is not inserted.

The receiver that is designed in accordance with the SDLC protocol follows an algorithm that states that a frame delimiter is established when a flag byte is detected. Thereafter, a "zero" bit is discarded if it follows five consecutive "one" bits. Thus, every byte in the frame can have any possible combinations of eight bits without confusing the receiver.

Associated with the efficient protocol is the need for rules to govern the conditions under which a terminal can insert or transmit data onto the communication link. The "poll" is a well-known prior art technique. With this technique the control processor periodically issues a short message called a "poll." A station or I/O device on receiving a poll transmits previously assembled data to the control processor.

In addition to the above teachings, the prior art sets forth other types of transmission techniques which can be used to exchange messages within a distributive data processing installation. The following patents set forth some of the prior art techniques.

U.S. Pat. No. 3,866,175 describes a system and method for communicating data between a central processor and a plurality of remote interactive data terminals over a single channel. A controller coupled to the channel generates each poll message, for a designated terminal, by selectively utilizing the output of an address generator. A recirculating shift register whose output signifies whether a terminal is active or inactive is synchronized with the operation of the address generator to allow the controller to poll only those terminals which are active.

U.S. Pat. No. 4,156,866 describes a distributive data processing system wherein a plurality of remote terminals are coupled over a single channel to a central computer. Each terminal has a unique address that is used by the central computer to effectuate communication therebetween. A valid message to a terminal consists of two sequential transmissions of the terminal's address and a combination of command signals that accompany the addresses to determine the function that is enabled at the receiver.

U.S. Pat. No. 3,453,597 describes a multi-station digital communications system wherein a single channel interconnects the multi-station with a transmitting station. The transmitting station addresses each remote station with a unique address which is bracketed between start and stop bits, respectively.

U.S. Pat. No. 4,456,957 describes a distributive computing system wherein a single router module interconnects a plurality of data entry terminals to a host computing system and a permanent storage device. The router module utilizes routing logic including a decision table to effect the routing through the interfaces which couple the various systems.

U.S. Pat. No. 4,466,001 describes a semi-duplex communication system wherein a base station transmits a reference signal which each terminal uses as a syn signal. Each unit having data to send to the base station responds with a very brief signal such as a burst of silent carrier transmission during an assigned time slot in a queue of slots. Only those units which respond are subsequently polled in a polling cycle.

U.S. Pat. No. 3,903,507 describes a communications system wherein information from a central processor is sent to all terminals simultaneously and the processor "listens" to terminals individually. As each terminal is being addressed, the preceding address terminal is connected to the central processor by means of a multiplexor switching device. If the preceding address terminal has information to send, it raises its carrier which forces the central processor to abort further transmission of the current address.

U.S. Pat. No. 4,298,978 describes a communications system and efficient communication vehicle for exchanging information between terminals within the system. The communication vehicle consists of an address field and data field wherein the address field is being enclosed by a start and a stop bit while the data field has a single start bit and one stop bit if it precedes another data field and a single start bit and two stop bits if it precedes an address field.

It would appear from the above description that the prior art transmission technique may be broadly classified as SDLC type protocols and non-SDLC type protocols. Although the invention to be described hereinafter can be used with those devices which utilize the non-SDLC type protocols, it works well with those devices that use the SDLC type protocol and as such will be described in that environment.

SUMMARY OF THE INVENTION

It is therefore the main object of the present invention to provide a set of SDLC type protocols for use in a serial channel distributive data processing network.

It is a more specific object of the present invention to provide a basic transmission frame in which the overhead (that is, number of control fields) are fewer than were heretofore possible.

It is still another object of the present invention to simplify the transmission technique by eliminating the need for bit stuffing.

These and other objects of the present invention are attained by providing a basic frame format or transmission vehicle in which the beginning flag field and the device and/or terminal address field are merged. A control bit within the merged field is used to indicate whether the field is a delimiter field or a non-delimiter field. By utilizing the control bit, a more efficient transmission vehicle is provided with all possible bit combinations of a byte being available for use in a frame. Means are provided in the respective devices and control apparatus for generating and processing the frame.

The basic frame format includes an address field with the control bit (hereinafter called the delimiter control bit) therein, a control field, a data field, two CRC fields and an ending flag field. The fields are concatenated in the order of recitation. By providing a second control bit within the address field, the frame format is adjusted to transport different types of messages.

On the outbound channel from a control unit to a device, the messages include a "POLL." The "POLL" message includes the address field with the second control bit and the delimiter control bit being set in a predetermined first state. Preferably the bits are set to a logical "1." The address in the field is that of the device being polled.

A data message is similar to the basic frame format with the second control bit set to a predetermined second state, preferably a logical "0."

A response message is formed from the basic frame format less the data field. Finally, a special message called an "EOP" (End of Poll) is sent to the control element if a device receives a "POLL" and has no message to transmit.

The foregoing and other features and advantages of this invention will be more fully described in the accompanying drawings.

BRIEF DESCRIPTION OF THE DRAWINGS

FIG. 1A shows a schematic of a distributive data processing system.

FIGS. 4A–4D show functional flow charts (software and/or hardware) for a device controller.

DESCRIPTION OF THE PREFERRED EMBODIMENT

Although the present invention to be described hereinafter can be used in any type of computer system, it works well in a computing system adapted for use in a retail establishment, department store, etc. and as such will be described in that environment. Such special purpose computing systems are often referred to as a point of sale terminal. This common terminology will be used hereinafter. However, this should not be construed as a limitation on the scope of the present invention since it is well within the skill of one skilled in the art to use the teaching of the present invention in other types of computing systems.

FIG. 1A shows a block diagram for a point of sale computing system. The system includes a plurality of data terminals identified by numeral 10. The data terminals are coupled through a communications medium 12 to a store controller 14. The store controller in turn is coupled through a communication link 16 to a host computing system (not shown). Preferably, the communications medium is configured into a loop. Messages on the loop flow in the direction identified by the arrows. In this type of configuration the terminals are used to tally sales transactions while the store controller performs data collection functions, price adjustment, price look-up, store management functions, etc.

Figure 2A:
FIGS. 2A–2D show graphical representations of the message formats used to shuttle information within the data processing system.

FIGS. 2A–2D show a graphical representation of the message format or frame that is used for shuttling messages between the terminal and its attached I/O devices. FIG. 2A shows the format for a data frame. This data frame is used to shuttle information from a control unit (to be described subsequently) to an attached device (to be described subsequently) or from the device to the control unit. The data frame includes an address field, a control field, a data field, two CRC (cyclic redundant check) fields and an ending flag field. The CRC and the flag fields are similar to those fields used in the well known SDLC type protocol. As such a detailed description of these fields will not be given. If one needs to know detailed information about these fields, then one can consult the SDLC functional specification describing these fields. Suffice it to say at this time that the CRC fields carry error information which is calculated by a well-known polynomial at the sending station and is transmitted as a part of the message. The ending flag field indicates to a receiver that the message is completed. The data field carries the data which is to be exchanged between the I/O device and control unit. The control field carries control information such as data frame, response to a data frame, requests to go on line, acceptance of an on-line request, etc. This control information is similar to that used in the well-known SDLC type protocol.

The address field is used for two purposes. It carries the address of an I/O device and it also serves as the start delimiter field for a message or frame. As will be explained in more detail subsequently, in order to perform its dual role (that is, as a start delimiter field and an address field) a control bit in the field is used to indicate when the field is a start delimiter or a transparent data character. Preferably, when the control bit is set in a first state, say, a logical "1", the field is a start delimiter field. The other setting of the control bit indicates that the field is transparent data.

Figure 2B:
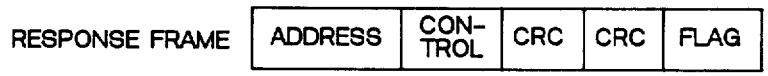

FIG. 2B gives a graphical representation of a response frame. The response frame is used to transport bidirectional traffic (that is, to convey a response from the control unit to a device or vice versa). It should be noted that all messages are followed by a response from the recipient unit. A recipient unit can be a device or the control unit. The response is necessary in that it advises a sending unit as to whether or not a message is received. Fields which are common between FIGS. 2A and 2B are given common names and perform the same function. Since the common functions have already been described, relative to FIG. 2A, the descriptions will not be repeated here.

Figure 2C:

FIG. 2C shows a graphical representation of the "poll" frame. The "poll" frame is the vehicle that enables a device to transmit a message onto the channel. As will be explained subsequently, the control unit together with the communication controller prepares the "poll" frame and sends it on the serial I/O channel. A device sensing its address on the channel is free to seize the channel and transmit a message to the control unit. The core of the polled frame is the address field. The bit definition in the address field will be given subsequently. It should be noted that the function of the address field, in the poll frame, is similar to its function in the data frame and/or the response frame.

In the preferred embodiment of this invention the address field for a poll is preceded by 24 "1" bits. It is also followed by 24 "1" bits and another address field. The bit sequence that precedes and follows the address field is primarily used to condition the line or the receiver. Of course, any other bit sequence could be used for conditioning the line and the specific implementation shown in FIG. 2C should not be construed as a limitation on the scope of the present invention. As stated before, the core of the polled frame is the address field only including the control bits. The bits which are transmitted for conditioning or priming the line are a matter of design choice only and can be varied in number and other patterns without departing from the scope or spirit of the present invention.

Figure 2D:
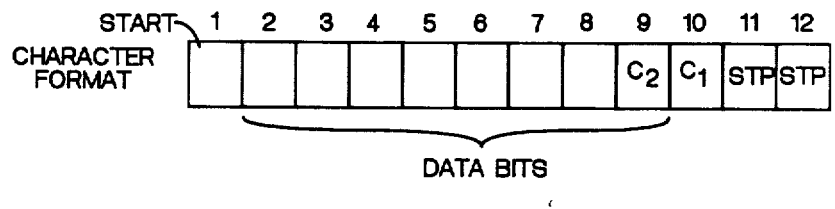

FIG. 2D shows the detailed bit structure for a character format on the channel. The character comprises of 12 bits numbered 1 through 12. Bit 1 is the start bit and is usually a logical "0." Bits 2 through 9 are data bits. Bit 9 (labeled $C_2$) is the send/receive control bit only when the character is an address. This bit when set in a first state, say a logical "0," informs a recipient device that a message is on the channel for the device. Similarly, a logical "1" in the $C_2$ position indicates to the recipient device that the message is a "poll" and the device may send any message it has to the control element. If the device does not have a message to send to the control element or unit, it sends a special "poll response" message. This poll response message is called "End of Poll." The poll response message signifies that a sender has no message. This poll response message is a predetermined sequence of bits.

Still referring to FIG. 2D, bit position 10 carries the delimiter control bit ($C_1$). Depending on the setting of this bit, the recipient device will characterize the field as the beginning or ending delimiter of a frame or a transparent data field within the frame. Preferably, when the bit is set to a logical "1," the field is a "start delimiter field or an end delimiter field." Similarly, if the bit is set to a logical "0," then the field is transparent data. It should be noted that the logical designation or setting in both the C1 and C2 positions can be changed without deviating from the scope or spirit of the present invention. Also, other bits within the character format can be used as the designated control bits without departing from the scope of the present invention. Bits 11 and 12 are used as two stop bits and are both set to a logical "1." It should be noted that synchronization is done on a character basis. This means that a "0" indicates the beginning of a character and the two stop bits indicate the end of the character.

Figure 1B:
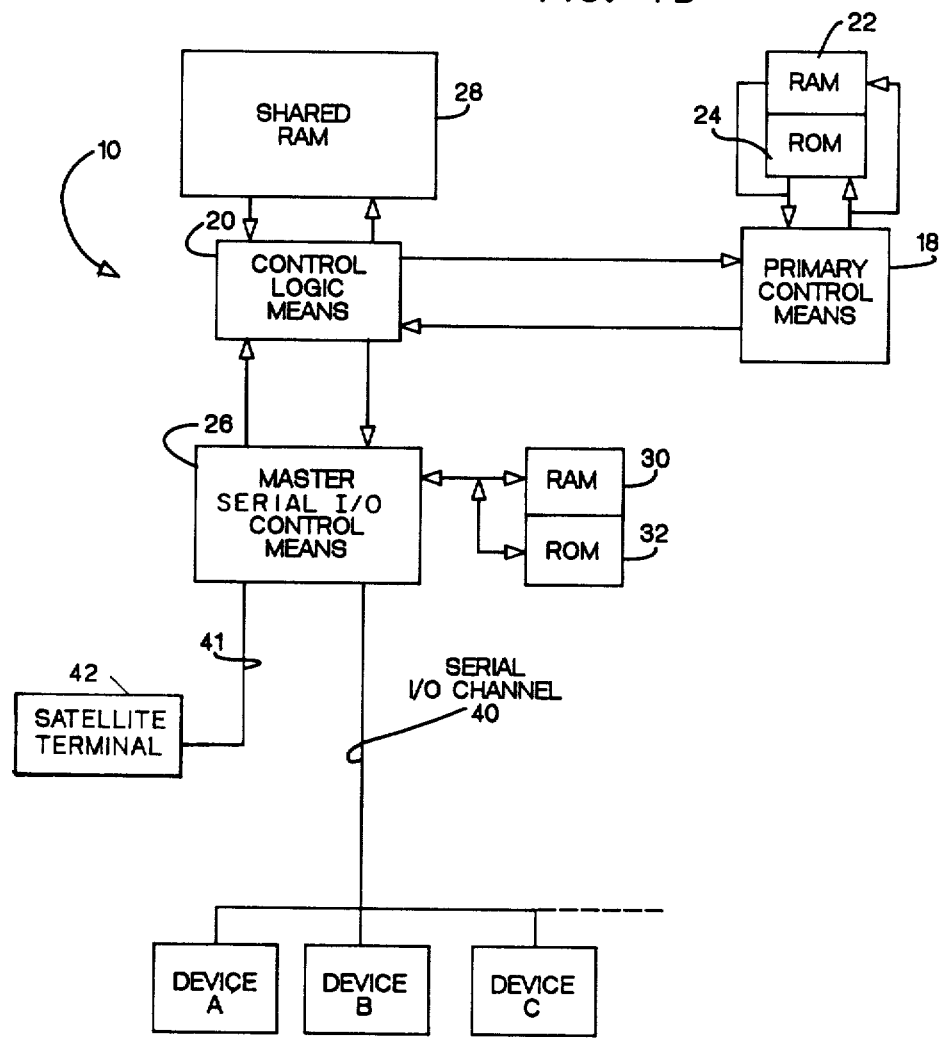
FIG. 1B shows a block diagram (of a terminal in the distributive data processing system) embodying the teachings of the present invention.

FIG. 1B shows a block diagram for a terminal in the point of sale system of FIG. 1. This terminal embodies the teaching of the present invention. The terminal 10 includes a primary control means identified by numeral 18. The primary control means 18 is the primary control element of the terminal. Its function is to control the terminal and to interface between the terminal and the store controller previously described in relationship to FIG. 1. Among the functions performed by the primary control means 18 are the hard total function, price lookup, etc. In the preferred embodiment of this invention, the primary control means 18 is an Intel 80286 microprocessor. This is an off-the-shelf microprocessor manufactured by the Intel Corporation. This being the case, details of the microprocessor are available in the product manuals which can be obtained from the manufacturer. If details of the microprocessor are needed, these manuals are available for consultation. Suffice it to say, at this point, that this microprocessor carries a set of programming instructions and by outlining the functions which the microprocessor is to perform it is well within the skill of a programmer to program the microprocessor. Of course, any other type of microprocessor can be used without departing from the scope or spirit of the present invention.

The primary control means 18 is tied through appropriate conductors to control logic means 20, RAM 22 and ROM 24. RAM 22 and ROM 24 store the microcode that is used in the primary control means 18. In addition, RAM 22 is used as a working memory for the primary control means 18. Control logic means 20 contains the logical circuitry which is manipulated so that either the primary control means 18 or the master serial I/O control means 26 is given access to shared RAM 28. As with the primary control means 18, the master serial I/O control means 26 is connected to a RAM 30 and ROM 32. The function of ROM 32 is to store the microcode that runs in the master serial I/O control means 26 while RAM 30 is used as the working storage. In the preferred embodiment of this invention, the master serial control I/O means 22 is an Intel 8051 microprocessor. This is an off-the-shelf device which is manufactured by the Intel Corporation.

Serial I/O channel 40 interconnects a plurality of I/O devices A-C to the master serial control means 26. Serial I/O channel 41 interconnects a satellite terminal 42 to the master serial control means. Although not shown in the figure, the satellite terminal 42 carries a plurality of I/O devices similar to devices A-C. Each of these devices is fitted with a microcomputer or microprocessor. Preferably, the microprocessor in the I/O devices is a 8051 microcontroller. The satellite terminal 42 has no primary microprocessor and relies on the primary control means 18 for performing all intelligent functions. Essentially, the satellite terminal provides power to the attached I/O units (not shown). The details of using a shared RAM 28 to interface between the primary control means 18 and communications controller 26 are given in the above cited IBM application. The details of that application are incorporated herein and can be referred to for purposes of completing any details which are not disclosed in the present application.

Suffice it to say, at this point, that in order to exchange messages between an attached device and the primary control means 18 the primary control means requests use of the shared RAM 28 from the master serial control means 26. Whenever the master serial control means 26 completes any outstanding process using the shared RAM 28, control of the RAM is switched over to the primary control means. The primary control means stores in an appropriate area of the RAM different types of messages which are to be transferred to any of the I/O devices. When the information is loaded in the shared RAM, the primary control means 18 notifies the master serial control means 26. The master serial control means in turn transfers the information to the appropriate I/O device.

Similarly, information for the primary control means 18 is sent over the serial I/O channel through the communication control 26 into the shared RAM. The communications controller 26 informs the primary control means 18 that a message is in the shared RAM. Control of the shared RAM is then turned over to the primary control means 18 from whence the stored message is retrieved. To this end, the shared RAM is sectioned into a commands and status area, a poll list area, and a receive and transmit buffer area. A controller or microprocessor, be it the primary control means 18 or the master serial I/O control means 26, on accessing the shared RAM, looks in the respective section for appropriate information.

For example, the commands and status area carries command and status information. Therefore, if one of the controllers wants to access command and status information, that portion of the RAM would be accessed. Similarly, the poll list area carries the poll list (to be described subsequently) of the devices that are attached to the system. As will be explained subsequently, in order for a device to gain access to the serial I/O channel 40, the master serial control means sends a message on the channel. The message carries the address of the device and depending on the status of the previously-described control bit $C_2$, the device can either send a message to the primary control means 18 or receive a message from said control means 18. The master serial control means continuously cycles through the poll list and as a result each device is given the opportunity to communicate with primary control means 18. The receive and transmit buffer section of the RAM carries buffers that are used for receiving and transmitting data from respective units within the data processing system.

Figure 3:
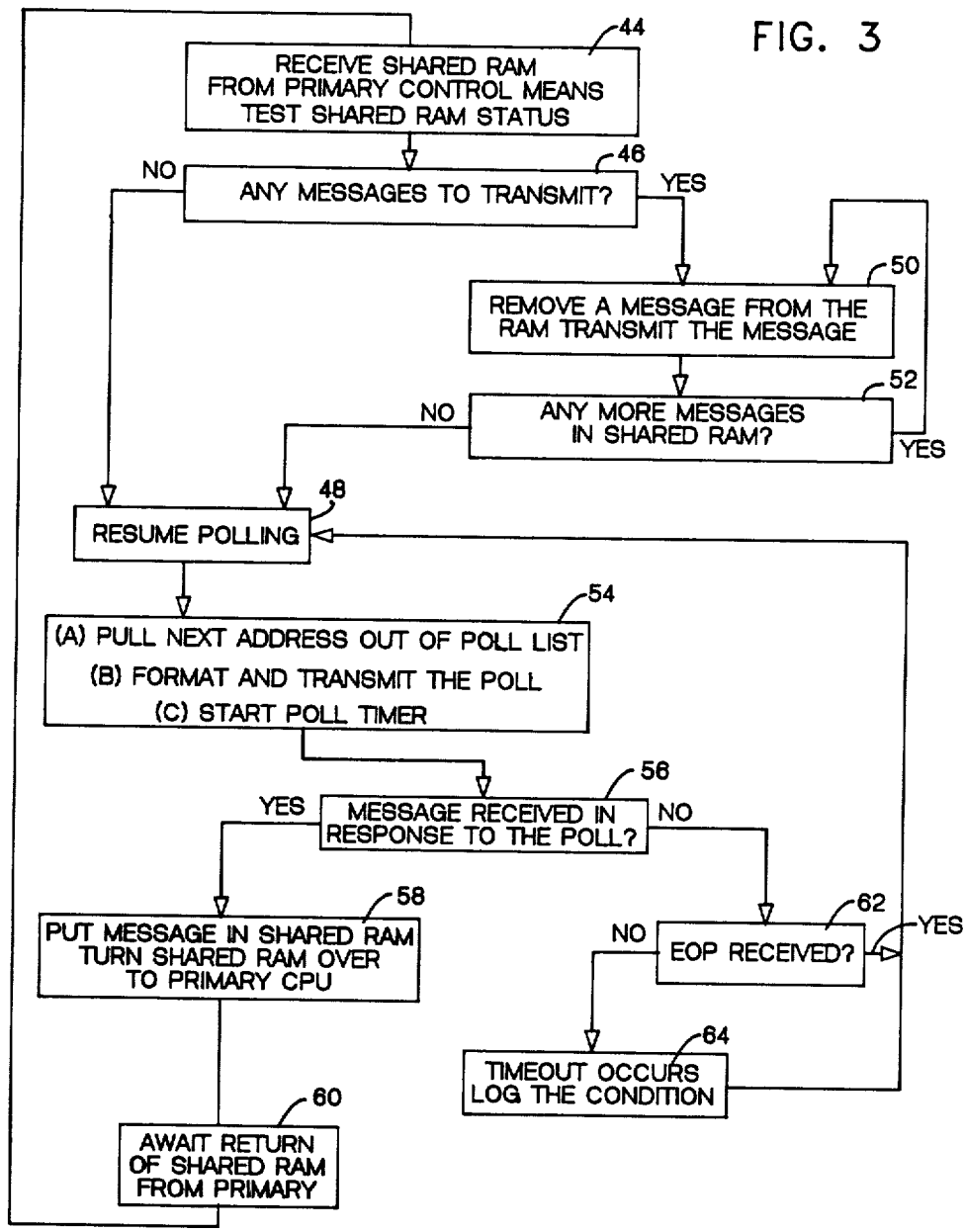
FIG. 3 shows a flow chart of a program for operating a communication or serial channel controller.

The present invention is primarily concerned with the frame format and the method used in order to shuttle messages between the I/O device and the primary control means via the master serial control means 26, also called communication controller 26. FIG. 3 shows a flow chart for the program that controls the master serial I/O control means 26. As stated previously, this master serial I/O control means 26 is an off-the-shelf microprocessor identified as the Intel 8051 microcontroller. This microcontroller has its published instruction set and knowing that instruction set with the process steps set forth in FIG. 3, an average programmer can generate a program which would force the microprocessor to perform the steps according to the teaching of the present invention. Among the features of the microprocessor is a serial I/O port which is connected to the serial I/O channel 40 and controls traffic (both inbound and outbound) on said serial channel.

Still referring to FIG. 3, the first step in the program is identified by block 44. In block 44 the program checks to see if the primary control means 18 relinquishes control over shared RAM 28. This is done by checking the status of control latches within the control logic means 20 (FIG. 1B). The details are described in the above-identified application which is incorporated herein by reference. The program also tests the status of the shared RAM. If the RAM is available, the program then descends into block 46. In block 46 the program checks to see if there is any message to transmit. If there is no message to transmit, the program descends into block 48 where it resumes polling of the stations listed in the poll list. This polling is done sequentially and on a continuous basis when there is no message in the transmit buffer to send to any of the devices.

Still referring to FIG. 3 and in particular block 46, if there is any message to transmit, the program then descends into block 50. In block 50 the program removes the message from the RAM and adds certain channel characteristics which were not placed on the message when it was deposited in the shared RAM from the primary control means 18. The master serial control means 26 then transmits the message. The program then descends into block 52 where it checks to see if there are any more messages in the shared RAM to transmit. If there are more messages, the program then goes into a loop and continues to prepare and transmit messages until the messages are completed and then descends into block 48. As before, in block 48, with all the messages transmitted, the program continues to cycle through the poll list in sequential or descending order.

The program then descends into block 54. The polling routine, in block 54, includes (a) polling the next address from the poll lists, (b) formatting and transmitting the poll and (c) starting the poll timer running. The format of the poll message is already described and will not be repeated here. The program then descends into block 56. In block 56, the program checks to see if any message is received as a response to the poll. If a response message is received, the program descends into block 58. In block 58 the program puts the message in the shared RAM and turns control of the shared RAM over to the control means or primary CPU or control element. The program then descends into block 60 to await return of shared RAM. If there is no message response to the poll (block 56), the program then descends into block 62 where it checks to see if it received the special EOP character or message. If it has received the EOP sequence of bits, the program then loops back to block 48. If it did not receive the EOP sequence of bits, the program then descends into block 64. In block 64, the poll timer which was started at block 54 should time out and the program logs the error condition and loops back to block 48 where it resumes polling the attached devices.

Having described the link control at the master serial I/O controller end of the channel, the link control at the device end will now be described. This description is given in conjunction with FIGS. 4A-4D.

Figure 4A:
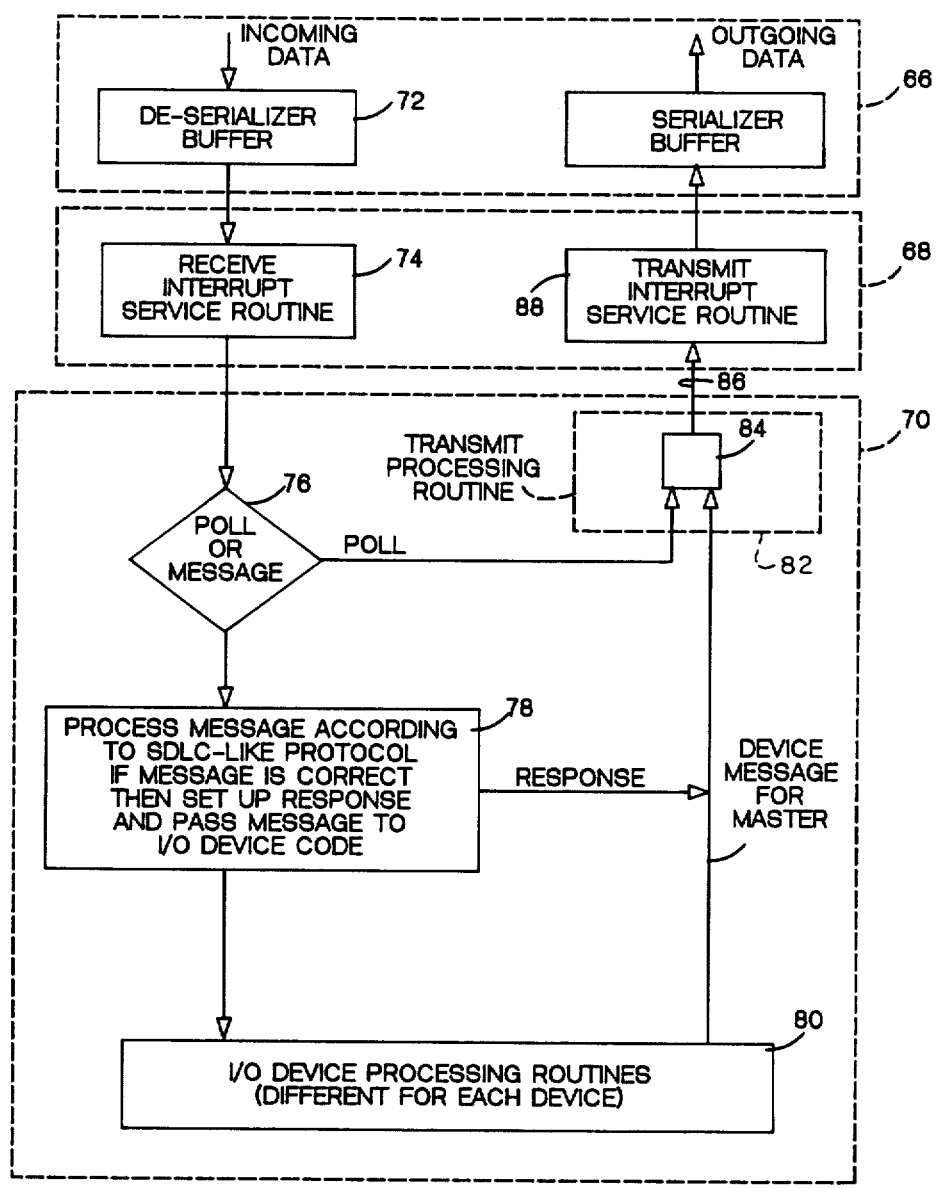

FIG. 4A shows a functional flow chart for the controller residing in each I/O device. As stated above, in the preferred embodiment of this invention, each device is controlled by an 8051 Intel microcontroller. Of course, other types of microcontrollers can be used without departing from the scope of the present invention. This microcontroller is program controlled. Its primary task is to control the operation of a particular device. This device may be a keyboard, a display, a scanner, etc. In addition to controlling the device, the controller controls messages to and from the serial I/O channel. To this end, the device controller includes a communications hardware control section 66, a hardware interrupt handler section 68 and a program control section 70. The communications hardware control section 66 includes a deserializer buffer (SBUF) identified by numeral 72. Incoming data from the serial I/O channel is fed into the SBUF. Data is read from the SBUF into the receive interrupt service routine means 74. Details of the receive interrupt service routine means 74 will be given later. Suffice it to say at this point that the function of the receive interrupt service routine means 74 is to receive data from the deserializer, determine whether it is a message or a poll and to pass the information on to the program control section 70.

Block 76 of the program control section determines if the received information is a poll or a message. If it is a message, it is routed along a first path into control block 78. In control block 78 the message is processed in accordance with rules similar to the well-known SDLC-like protocol. If the message is correct, the program running on a background level then sets up a response message and passes the message to the I/O device code block 80. In actuality, the message is stored in memory and the device is notified of the message. As is shown in block 80, the I/O processing routine which is different for each attached device retrieves the message and processes it in accordance with the requirements of the particular device. The way in which the message is processed for the device is not a part of this invention and therefore a detailed description will not be given.

Still referring to FIG. 4A, outbound messages for the main controller, sitting in the device, can be a response to a previously received message. As stated previously, a recipient unit must prepare and forward to a sending unit a "Response" acknowledging receipt of the message. The response is prepared and outputted from block 78 on the line labeled "Response." Likewise, a message for the "MASTER" from a device is prepared by the device and is routed through block 80 on the line labeled device message for "Master" to block 82. The messages are then queued up in the memory and the transmit processing routine means 82 extracts the message and if there is a poll coupled with a message, the two signals (i.e., the poll signal and the message signal) are combined by logical "AND" block 84 and are outputted on the line labeled with numeral 86. It should be noted that when a "POLL" is received on block 76, it is routed along a path labeled "POLL." The "Poll" path is different from the "Message" path (FIG. 4A). The message on line 86 can be a device message, a response, or end of poll message. The signal on line 86 is fed into the transmit interrupt service routine block 88. In block 88 the interrupt from the processor signifying that it has a message to transmit is accepted and the data is written into serializer buffer (SBUF) 90 from whence it is outputted on the serial channel.

Figure 4B:
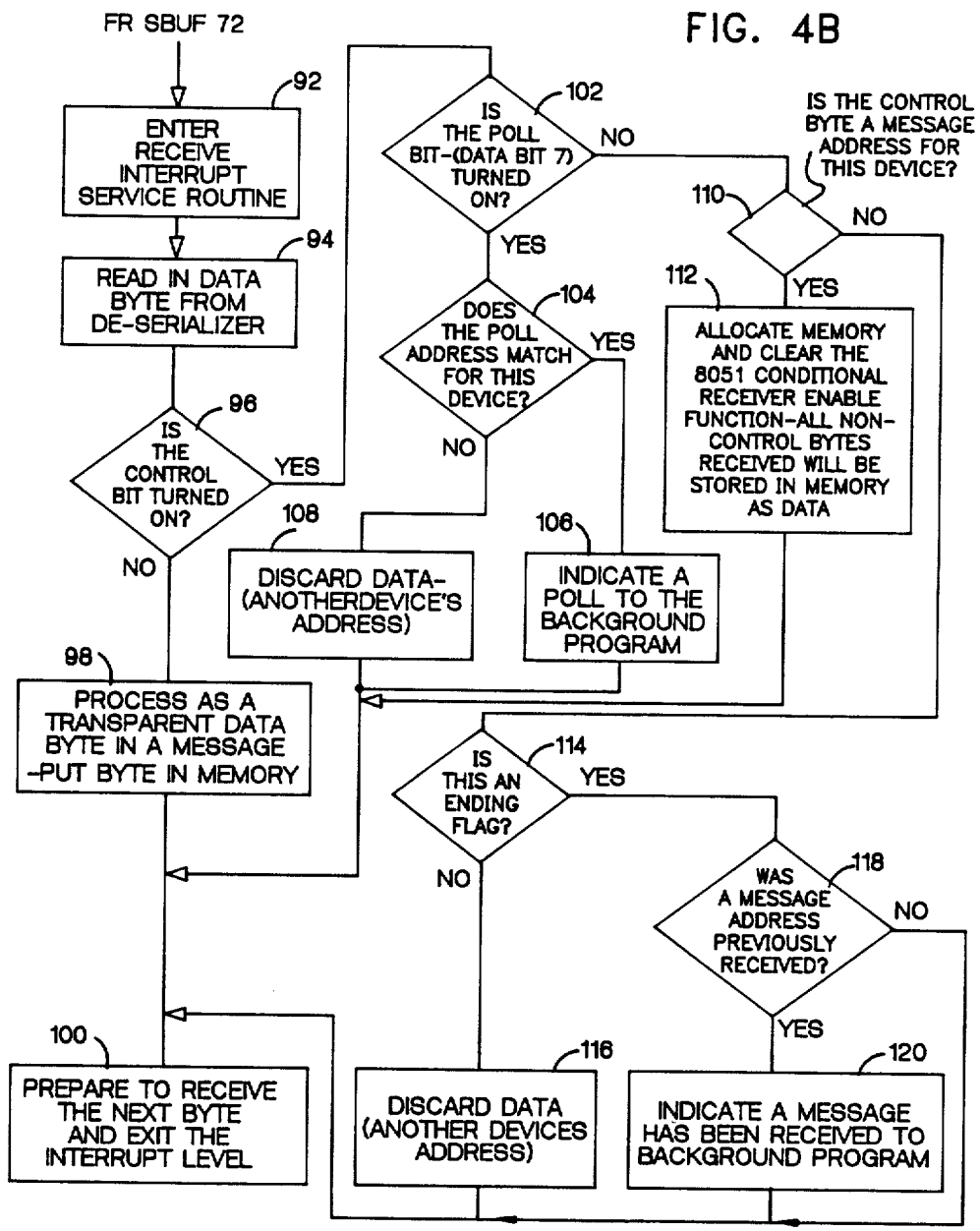

FIG. 4B shows a flow chart of a program that runs in the receive interrupt service routine means 74 to process the data from the SBUF. Block 92 is the entry block into the routine. From block 92 the program descends into block 94 where it reads in data bytes from the deserializer buffer (SBUF). In block 96 the program checks to see if the delimiter control bit 10 (FIG. 2D) is on. If it is not on, the program descends into block 98. In block 98, the byte of data is processed as a transparent data byte in a message and is placed into memory. The program then descends into block 100 where it prepares to receive the next byte of data. It should be noted that the program takes an interrupt on a boundary, processes the byte and then exits that interrupt level. If another byte is present, it then takes another interrupt and repeats the process.

Still referring to FIG. 4B, if the control bit is on (block 96), the program enters block 102. In block 102 the program checks to see if bit 9 (data bit 7) is turned on. If it is turned on, the program descends into block 104 where it checks to see if the address in the poll matches the device address. If it matches, this indicates a poll to the background program (block 106). The program then descends into block 100. In block 100 the program performs the previously-described function relative to that block. If the poll address does not match the device address (block 104), the program then descends into block 108 where it discards the data. Quite likely the data is for another device. The program then enters block 100.

If the poll bit (block 102) is not on, the program then enters block 110. In block 110, the program checks to see if the address byte is a message addressed for this device. If it is, the program then descends into block 112. In block 112 the program allocates memory to receive the message and clears the 8051 conditional receive/enable function. All non-control bytes received thereafter are stored in memory as data. The setting of Bit $C_1$ is used to determine if a byte is a delimiter or transparent data. It should be noted that the 8051 controller used a "Conditional Receive/Enable Function" to receive the first byte of a frame. If after receiving the first byte of the message the program performs the enunciated tests and it is determined that the message does not belong to that device, then no further reception of the message is permitted. The message is disregarded.

Still referring to FIG. 4B, from block 112 the program then descends into block 100. If the address byte is not a message addressed to this device (block 110), the program descends into block 114. In block 114 the program checks to see if the message is an ending flag. If it is not an ending flag, the program descends into block 116 where it discards the data as that for another device. If the message is an ending flag (block 114), the program then descends into block 118. In block 118, the program checks to see if a message address has been previously received. If it has, the background program running in the processor is informed that the message has been received (block 120). If a message address was not previously received (block 118), the program then descends into block 100.

FIG. 4C shows a flow chart of the protocol processing routine described in block 78, FIG. 4A. The first block in the process (block 122) is an entry block. From block 122 the program descends into block 124. In block 124 the program checks to see if the CRC bytes are correct. If the bytes are in error, the program descends into block 126 where the message is discarded and the program descends into block 128. In block 128, the program returns to device processing routine. If the CRC bytes are correct in block 124 the program descends into block 127. In block 127, the program checks to see if the message is an initialization command, that is, set normal response mode (SNRM). If it is, the program then descends into block 129. In block 129, the program acknowledges that the device is initialized and then descends into block 128. If the result of the test in block 127 is negative, the program then descends into block 130. In block 130, the program checks to see if the message is an acknowledgment of a previously transmitted message. The response to a previously transmitted message is called Receiver Ready (RR). If it is, the program then descends into block 132. In block 132 the program clears previously transmitted message and then descends into block 128. If the result of the tests in block 130 is negative, the program then descends into block 134. In block 134 the program checks to see if the message is a new message for the device. If it is, the program descends into block 136. In block 136, the program sets up an acknowledgment and passes the receive message to the I/O device. If the result of the test in block 134 is negative, the program then descends into block 138. In block 138, the program repeats the previous acknowledgment or sends command reject if an error occurs and if the error is unrecoverable. The program then descends into block 128.

Figure 4D:
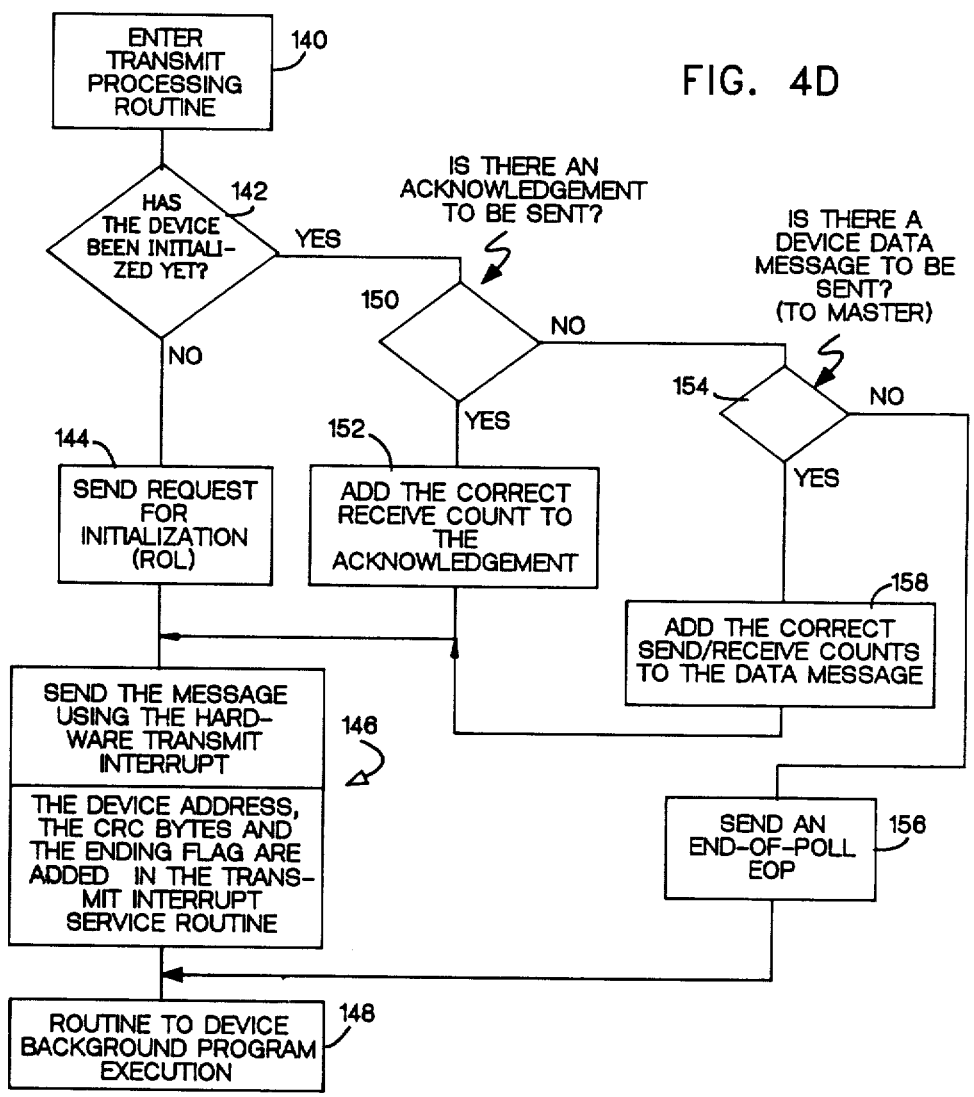

FIG. 4D shows a program routine for the transmit processing routine (block 82, FIG. 4A). The first block in the routine (block 140) is an entry block. From block 140 the program descends into block 142. In block 142 the program checks to see if the device has been initialized. If it is not initialized, the program descends into block 144. In block 144, the program sends out a request for initialization (ROL) and descends into block 146. In block 146 the program sends the message using the hardware transmit interrupt. The message includes the device address, the CRC bytes, and the ending flag are added in the transmit interrupt service routine. The program then descends into block 148. In block 148 the program returns to device background program execution.

It should be noted that the initialization technique for the device is performed by the main computer in the terminal. If the device has already been initialized (block 142), the program then descends into block 150. In block 150 the program checks to see if an acknowledgment should be sent to the main processor. If an acknowledgment is to be sent, the program descends into block 152 where the program adds the correct receive count to the acknowledgment and the acknowledgment is processed using the information in blocks 146 and 148, respectively. The device data message is processed using the information in block 146 and 148, respectively. If there is no acknowledgment to be returned, the program then descends into block 154. In block 154 the program checks to see if there is a device data message to be sent to the master. If there is a device data message to send, the program descends into block 156. In block 156 the program adds the correct send/receive counts to the data message. If there is no device message to send to the master, the program then descends into block 158 where it sends an end of poll message to the master and then descends into block 148.

OPERATION

In operation, the main processor 18 (FIG. 1B) prepares and transmits the polling list to the section of the shared RAM that is reserved for that purpose. As described in the above identified application, each entry in the poll list is comprised of two bytes: a link address byte and a device address byte. The link address byte is not outputted on the link by the master serial controller means 26 (FIG. 1B). The master serial controller means 26 generates a poll to a device whenever there is no data to transmit in the shared RAM. The master serial I/O control means selects a link with link address. However, it does not transmit the link address. When a poll frame is transmitted, the link controller (also called the master serial I/O control means 26) sets the eighth data bit of device address (Bit 9 of FIG. 2D) to a logical "1." When a poll frame is transmitted, the link controller starts a timer and goes into a receive mode. The poll cycle is terminated when a frame is received from the polled device or an "EOP" character is received from the polled device. As stated previously, the "EOP" character indicates that the device has nothing to transmit.

Likewise, the poll cycle is also terminated if the timer expires indicating that the device did not respond. "EOP" or time-out causes the link controller to go to the next entry in the poll list. If a frame is received from the polled device, the link controller stops polling, places the received frame in the portion of the RAM designated for that purpose and interrupts the main processor indicating that the received message is in the shared RAM. With the control of the shared RAM transferred to the main processor, the main processor can remove the information from the shared RAM to its own RAM for further processing.

Whenever the main processor returns the shared RAM to the link controller, polling is resumed at the next entry in the poll list. However, if a transmit frame has been placed in the shared RAM by the main processor, the link controller would transmit the frame to the appropriate device before polling is resumed. Polling is resumed after all frames are transmitted.

Whereas the master serial I/O controller means 26 (FIG. 1B) controls the serial channel at the shared RAM side of the channel, the controller in each device controls the serial channel on the device end of the channel. As stated previously, both the master serial control means 26 and the controller in each device are 8051 Intel microprocessors. To this end, when an I/O device is powered up, the 8051 in the I/O device sets up the 8051 serial channel hardware to the state required to interface with the serial I/O channel 40 (FIG. 1B). The serial control hardware register (not shown) in the 8051 is set to a predetermined value. The setting implies the serial port operation mode approximately 187,500 bits per second transmission rate with a minimum 11 bit data frame for each byte. Received interrupts are enabled and the conditional receive/enable function of the 8051 is selected. The conditional receive/enable function, when selected, allows interrupts only on bytes that have the control bit (bit 10) in the 12 bit frame, turned on.

Essentially, serial I/O code in the device is separated into two parts. One part is the interrupt handler which decodes the raw data from the serial I/O channel and recognizes polls and messages for the device. The other part of the code takes the polls and messages, passes them from the interrupt handler and determines the appropriate action to be taken. While the conditional receive enable function is selected, the 8051 interrupt mechanism is triggered only by frames that have the control bit (bit 10) turned on. The conditional receive/enable function is disabled only when an I/O device has seen its own message address on the serial I/O channel. Otherwise, the device only reads in other device addresses and end flag bytes. The I/O device does not read the transparent data intended for other devices. This prevents the device from decoding its address in the transparent status.

Received interrupts are always enabled in the I/O device unless it is sending data to the main processor. During that time the receive interrupts are disabled to prevent the 8051 from seeing its own message address in the data that it sends to the master. The device controller uses a "vectored" interrupt. This means that when a serial I/O interrupt occurs the program running in the controller branches to a specific location in the 8051 memory and saves the previous location in the stack. When the 8051 receive interrupt occurs, the code branches and the following procedure is followed:

(1) An 8-bit data byte is immediately read from the deserializer buffer (SBUF). The control bit $C_1$ is also read from its location in the deserializer buffer. As stated previously, this is bit 10 of FIG. 2D. Once these operations are performed, the received interrupt hardware indications (RI) can be cleared. After RI is cleared, the 8051 deserializer is able to receive another byte from the serial I/O link or channel.

(2) The control bit is then checked. If it is turned on, then the remaining 8 bits of the byte are examined as an end flag byte or an address byte having a specific link control definition on the serial I/O. If the control bit is not turned on, then the byte is processed as part of a data message that follows a valid device address on the serial I/O.

(3) Once the byte is identified as an address byte, the most significant bit of the byte is examined to determine if the address byte is a "poll" address. The poll address for a particular address is the same as the message address except that the most significant bit is turned on for the "poll" address.

(4) If the byte is a "poll" address, then the address is compared to the device address for that particular 8051. If a poll address matches the 8051 address, this information is stored away for later action after the controller has returned from the interrupt level.

(5) If the byte is not a poll address, it is checked against the possible message addresses for the device. A possible message address for the device includes the broadcast address which is used in the terminal to send a message to all devices at once. If the 8051 detects a match between the address and the message at any one of the valid addresses for that 8051, then it is assumed to be the start of the message and the conditional receive/enable function of the 8051 is disabled. A receive buffer is located to receive the message and status is updated to indicate that the message is being received. When the ending flag character of the message is received, the 8051 enables the conditional receive/enable function again and sets up status to indicate to the serial I/O message processing code that the message has been received. The message is processed on the interrupt level. Processing consists of determining if the message is valid, updating the send/receive counts, if it is valid, then setting up the appropriate response to the message. The response is sent, on the next poll, to the main processor. The interrupt handler code contains appropriate error recovery routines so that incomplete messages or otherwise invalid messages can be discarded.

The device controller also transmits data to the master serial I/O controller. When the device controller detects a "poll" to one of the addresses it is using, it has a window, defined by the Poll Timer, in which it can either start transmission of the message or send back an end of poll character indicating that it has nothing to send. If the device controller does not respond at all, that would indicate an error condition.

The device controller usually returns two kinds of messages to the serial I/O controller. One type of message is the responses that are required by the protocol. The other kind of message is the device data message that the I/O device code loads into a buffer to be sent back to the master.

The transmitted byte on the serial I/O channel is loaded into the serializer hardware. The serializer like the deserializer is called SBUF. The value of the control bit to be transmitted is loaded into bit position 8 in the serializer hardware. This completes the detailed description of the invention.

Several benefits inure to the user of the present invention. Among the benefits is that a synchronous data link protocol is made available for use on asynchronous data link.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a distributive data processing system wherein a plurality of remote terminals are coupled through a communications system to a control processing means a method for permitting the exchange of messages between the control means and the plurality of remote terminals comprising the steps of:
  (a) generating at the control processing means a first message including at least a first control field having a group of bits representing an address for one of the remote terminals and a control indicia set in a first state, a second control field having a group of bits set to a predetermined bit pattern and a second control bit set for the first state;
  (b) transmitting the first message through said communications system;
  (c) receiving a portion of the first message at a terminal having an address matching the address in said first message, and
  (d) at said terminal, examining the control indicia, and if said control indicia is set to the first state, characterizing said first field as a beginning delimiter and accepting into a receiving buffer of said terminal remaining fields of said first message until a field with the predetermined bit pattern is received.

2. The method set forth in claim 1 further including the step of characterizing the remaining fields as data and the predetermined bit pattern with the second control bit set in the first state as an ending delimiter.

3. A method for preparing a message which is used to communicate information between a central computing system and a plurality of data entry terminals said method comprising the steps of:
   (a) providing a storage area whereat a table of signals is maintained;
   (b) generating in a processor of said computing system the table of signals with each entry containing an identifying characteristic of the data entry terminals;
   (c) transferring the table of signals to the storage area;
   (d) accessing said table of signals and for each entry in said table generating a message characterized by at least a field having the identifying characteristics and a control indicia;
   (e) setting the control indicia in one of two states; and
   (f) transmitting the message to the data entry terminals.

4. The method set forth in claim 3 wherein the identifying characteristics include an address of the data entry terminals.

5. The method of claim 4 further including the steps of:
   (a) receiving the message at a data entry terminal whose address matches the address in the message;
   (b) examining the control indicia and continue to receive the message only if the control indicia is set in a first state.

6. The method of claim 5 further including the step of terminating reception of said message when a predetermined signal pattern is identified.

7. The method set forth in claim 4 further including the steps of:
   (a) receiving the message at a data entry terminal whose address matches the address in the message;
   (b) examining, at said data entry terminal, the control indicia and forwarding a frame only if the control indicia is set in a second state.

8. A method for generating a message for communicating between a central computing system and a plurality of data entry terminals said method comprising the steps of:
   (a) providing a storage area whereat a table of signals is maintained;
   (b) generating in a processor of said computing systems the table of signals with each entry containing an identifying characteristic of the data entry terminals;
   (c) transferring the table of signals to the storage area;
   (d) accessing said table of signals and for each entry in said table generating a message characterized by at least a field having the identifying characteristics and at least a control indicia;
   (e) setting the control indicia in one of two states with one of said states for indicating a beginning delimiter for the message and the other state for indicating data; and
   (f) transmitting the message to the data entry terminals.

9. In a computing system having a main processor coupled through a communications channel to a plurality of terminals a method for a terminal to distinguish between a control character and a data character comprising the steps of:
   (a) generating, at the main processor, a message with at least an identifying field having a first sequence of bits for identifying one of the plurality of terminals, a first control indicium associated with said first sequence of bits and set to a first of two states and a second field carrying a sequence of bits identical to the first sequence and a second control indicium set to a second of the two states;
   (b) transmitting said message through the communications channel to the plurality of terminals;
   (c) receiving the message at a terminal having an identifying sequence of bits matching the sequence of bits in said message; and
   (d) examining the first control indicium and if said first control indicium is set to the first state characterizing the identifying field as a control character and if said second control indicium is set to a second state characterizing the second field as a data character.

10. The method set forth in claim 9 further including the step of:
    generating and placing in the identifying field of step (a), a second control indicium set to one of two states.

11. The method set forth in claim 9 wherein step (d) is further characterized by the steps of examining the second control indicium only if the first control indicium is set to the first state and if said second control indicium is set to the first state characterizing the identifying field as a "poll message" and discard other fields in said message if said second control indicia is set to a second state characterizing the identifying field as a beginning delimiter field.

12. The method set forth in claim 11 wherein the first state is a logical "1" and the second state is a logical "0".

* * * * *